United States Patent [19]

Razdobreev

[11] Patent Number: 4,511,295
[45] Date of Patent: Apr. 16, 1985

[54] PNEUMATIC COLLET RELEASE TOOL

[76] Inventor: Vadim Razdobreev, 4150 Ohna Ct., Fremont, Calif. 94536

[21] Appl. No.: 419,895

[22] Filed: Sep. 20, 1982

[51] Int. Cl.³ .............................................. B23C 7/00
[52] U.S. Cl. ...................................... 409/233; 81/57.4; 408/239 R; 173/163
[58] Field of Search ............... 409/233, 230, 239, 234; 81/57.4, 57.35, 57.37, 430, 431, 432, 433, 434, 435; 279/1 E; 408/239; 173/163; 91/418; 137/881; 60/443, 407

[56] References Cited

U.S. PATENT DOCUMENTS

| | | | |
|---|---|---|---|
| 3,481,248 | 12/1969 | Engstrom | 409/233 |
| 3,680,437 | 8/1972 | Cravens, Jr. | 408/239 R |
| 3,753,383 | 8/1973 | Schmidt | 279/1 E |
| 3,797,956 | 3/1974 | Bayer et al. | 409/233 |
| 3,823,642 | 7/1974 | Jerue | 408/239 R |
| 3,898,911 | 8/1975 | De Caussin | 409/233 |
| 4,075,927 | 2/1978 | Frazier | 408/239 R |
| 4,382,730 | 5/1983 | Reinisch | 409/233 |
| 4,411,568 | 10/1983 | Rohm | 408/239 R |

FOREIGN PATENT DOCUMENTS

| | | | |
|---|---|---|---|
| 1390931 | 4/1975 | United Kingdom | 409/233 |
| 0476101 | 10/1975 | U.S.S.R. | 409/233 |

*Primary Examiner*—Gil Weidenfeld
*Assistant Examiner*—Thomas M. Kline
*Attorney, Agent, or Firm*—Townsend & Townsend

[57] ABSTRACT

A collet release device for rotating the draw bar on a milling machine is disclosed. The device includes a pneumatically-driven impact wrench which can be lowered to engage and drive the draw bar in the desired direction. The structure of the device includes a frame which is mounted at the top of the milling machine near the drive head of the draw bar. A carriage, which supports the impact wrench, is slidably mounted on the frame and may be lowered by a pneumatic piston. A single control switch actuates both the impact wrench and the piston. Depressing a first button on the control switch causes the impact wrench to engage the draw bar and rotate in a first direction, while depressing a second button causes the wrench to engage the draw bar and rotate in the opposite direction.

3 Claims, 3 Drawing Figures

PNEUMATIC COLLET RELEASE TOOL

BACKGROUND OF THE INVENTION

1. Field Of The Invention

The present invention relates generally to machine tools and, more particularly, to a device for tightening or loosening the draw bar of the machine tool.

2. Description Of The Prior Art

Milling machines are well known in the prior art. One such machine is described in Manual No. M-105, published by Bridgeport Machines, Bridgeport, Conn. As is typical in such machines, the cutting tool is held in a collet (or tool holder), which in turn is held in a spindle which is rotated directly by the machine. The collet is held in place by a draw bar, one end of which threadably engages the collet to hold it tightly against the spindle.

In order to change cutting tools, it is necessary to rotate the draw bar, while locking the spindle against rotation. Such action loosens the collet and releases the tool. Further rotation of the draw bar allows the collet to be removed and replaced. To replace the tool and/or the collet, the draw bar must be rotated in the opposite direction to "draw up" the collet to its proper location and to tighten the collet about the tool.

The collet is typically loosened by turning the draw bar head ("knob") with a wrench. If the collet does not readily loosen, manual force must be applied to the wrench, often by hammering at the extended end of the wrench. Such force can result in damage to the machine. Moreover, the use of the wrench in rotating the draw bar is time-consuming and inefficient. In some applications the collet and cutting tool assembly must be changed from ten to twenty times each hour. Even if the change takes only fifteen seconds, the time lost can amount to three to six minutes each hour. It is thus desirable to provide a more rapid and efficient method for both loosening and tightening the draw bar onto a collet.

While attempts have been made in the past to provide a more efficient means for releasing and changing collets, each suffers from disadvantages. U.S. Pat. No. 3,481,248 discloses an entirely automatic device for changing collets. A pneumatic motor having a socket disposed above the driven end of the draw bar is mounted in a fixed position relative to tne draw bar. A solenoid operated clutch engages the motor and the draw bar when it is desired to change collets. Although functional, the device contains a large number of moving parts which increase its cost and are subject to failure.

U.S. Pat. No. 3,680,437 discloses an entirely manual device for engaging and rotating the upper end of a machine tool draw bar. The operator must depress a handle with one hand, while rotating a socket with the other hand in order to rotate the draw bar. Thus, there will be little saving of time by use of the disclosed device.

U.S. Pat. No. 3,898,911 discloses an electrically-driven impact wrench which is mounted on the piston of a piston and cylinder assembly located above the driven end of the draw bar. The piston is raised and lowered pneumatically, and, in its lowered position, allows the impact wrench to engage the draw bar. Both the impact wrench and the support piston are typically under the control of an automatic programmer. The mechanism used for controlling both the piston and the impact wrench is not described.

It is thus desirable to provide a device to enable the user of a manually-controlled milling machine to rapidly and with minimal effort change the cutting tool and/or the collet on the machine. Moreover, it is desirable that the device be inexpensive, rugged and reliable.

SUMMARY OF THE INVENTION

The device of the present invention is a fully pneumatic collet release tool which is manually actuated by the user during milling operations. The device allows the user to change tools in a matter of seconds, typically below three seconds, resulting in a substantial saving of time. Moreover, the device eliminates the need for manual force in loosening the collet.

The device comprises a framework mounted at the top of the milling machine, generally above the free end of the draw bar. A carriage is slidably mounted on the framework and aligned to move toward and away from the draw bar. A pneumatic motor is secured to the carriage and includes a drive socket adapted to engage the free end of the draw bar when the carriage is in a lowered position, while remaining clear of the draw bar when the carriage is in a raised position. Typically, the carriage will be spring-mounted so that the drive socket remains free of the draw bar unless depressed by piston and cylinder assembly which is connected between the milling machine and the motor carriage assembly.

The present invention is characterized by a single pneumatic control switch which is capable of selectively actuating the pneumatic motor in either direction to either tighten or loosen the draw bar, while simultaneously actuating the piston and cylinder assembly to lower the socket into engagement with the draw bar. In this way, the collet can either be tightened or loosened in a single operation.

DESCRIPTION OF THE PREFERRED EMBODIMENT

A conventional milling machine, such as those manufactured by Bridgeport Machines of Bridgeport, Conn. and described in their Manual No. M-105, includes a work table, a machine head located above the work table, a drive spindle extending downward from the machine head to the work area and rotated by a drive motor (located in the machine head), a collet removably mounted in the lower end of the spindle and adapted to retain a cutting tool, such as a drill, mill or reamer, and a draw bar extending coaxially within the spindle and threadably engaging the collet within the lower end of the spindle. When the draw bar is fully tightened, the tool is secured within the collet and the collet is secured within spindle so that the tool, collet and draw bar all rotate as the spindle is driven.

In order to release the cutting tool from the collet, it is necessary to rotate the draw bar a certain amount to loosen the grasp of the collet on the tool. The collet itself may be released by additional rotation of the draw bar. As described earlier, both collets and cutting tools must be changed frequently during the course of work performed on the milling machine, and such changes are typically accomplished by manually rotating the upper end of the draw bar (commonly referred to as a 'knob') with a wrench.

Figure 1:
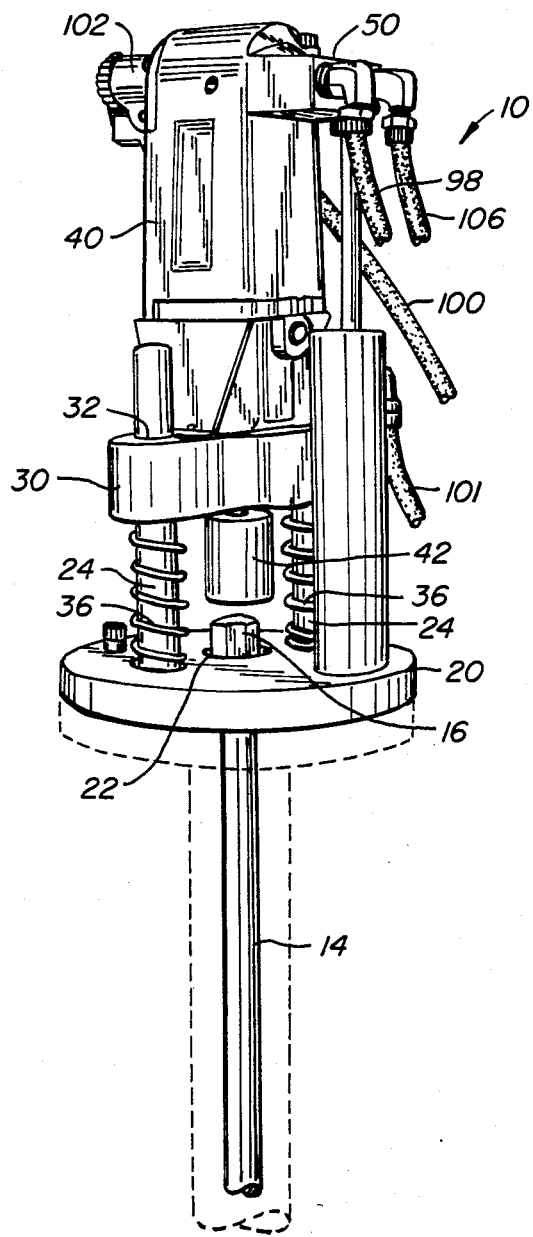
FIG. 1 is a perspective view of the collet release device of the present invention.
Figure 2:
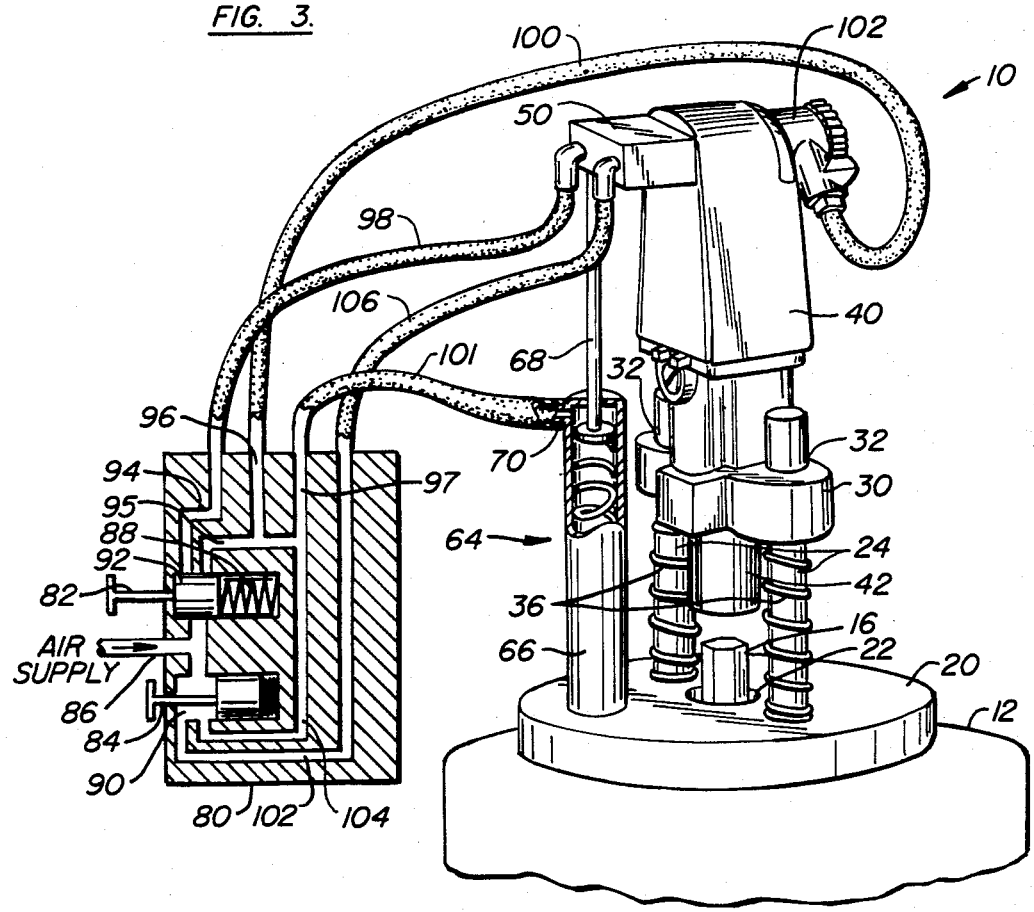
FIG. 2 is a perspective view of the device with portions broken away, including a sectional view of the pneumatic control switch.

Referring now to FIGS. 1 and 2, a collet release device 10 is shown mounted at the top of a machine head 12 (shown in phantom in FIG. 1) of a milling machine. A draw bar 14 extends downward from the machine head 12 to the work area (not shown), as described hereinbefore. The draw bar 14 includes a driving head (or knob) 16, typically a hex head, which may be rotated to release or mount the collet (not shown) of the milling machine, or to change work tools, as described hereinabove.

The collet release device 10 includes a base 20 having an aperture 22 which receives the upper end of the draw bar 14. The base 20 is secured directly to the machine head 12. A pair of posts 24 are attached at their lower ends to the base 20 and project upward therefrom.

A carriage 30 includes a pair of holes 32 at either end which receive the posts 24 and allow the carriage to travel upward and downward relative to the base 20. The carriage 30 also includes an opening, at its center for receiving the shaft of a pneumatic motor, as described hereinafter. The carriage 30 is mounted on springs 36, which are coaxial with the posts 24, and which support the carriage in a neutral position approximately half-way up said posts. The mounting of the impact wrench on the carriage 30 is more fully described and illustrated in co-pending application Ser. No. 304,230, the disclosure of which is incorporated herein by reference.

A pneumatic motor 40 is mounted on the carriage 30 and includes a drive shaft (not shown) depending downward toward the driving head 16 of the draw bar 14. A socket 42 is mounted on the distal end of the drive shaft so that it engages the drive head 16 when the carriage 30 is lowered. In this way, rotation of the motors 40 can rotate the draw bar 14 as desired.

Conveniently, the motor 40 is an air impact wrench such as the Sterling 700 (⅜-inch) manufactured by Rodac. As purchased from Rodac, the motor 40 includes a switch plate mounted on one side of the motor housing and capable of engaging one of two switch shafts. Depressing the first switch shaft causes rotation in one direction, while depressing the second switch shaft causes rotation of the motor in the opposite direction. For use in the present invention, the air impact wrench is modified by removing the switch plate, and mounting a pneumatic selector switch 50 adjacent the switch shafts.

Figure 3:
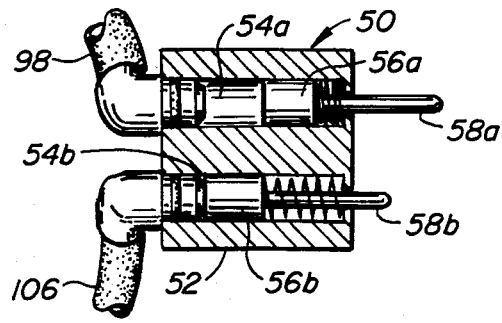
FIG. 3 is a sectional view of the pneumatic motor selector switch.

Referring now to FIG. 3, the pneumatic selector switch 50 comprises a block 52 having a pair of cylindrical bores 54 formed therein. A spring-mounted piston is placed in each bore and includes a shaft 58 extending from the spring side thereof. Thus, by placing air pressure on the side of the piston 56 opposite the shaft 58, the shaft is caused to extend outward from the bore. The switch 50 is mounted so that the shafts 58 replace the selector shafts on the impact motor 40, allowing remote pneumatic actuation of the motor.

A piston and cylinder assembly 64 includes a cylinder 66 mounted on the base plate 20 and projecting upward therefrom and a piston rod 68 which is connected at its distal end to the switch 50. The piston is spring-mounted so that the piston rod 68 is fully upward in the shelf (non-pressurized) condition. Applying pressure to inlet 70 lowers the piston rod 68 which in turn lowers the socket 42 onto the driving head 16 of the draw bar 14.

A control switch 80 is provided for operating the collet release device 10 in both a tightening and a loosening mode. The switch 80 is constructed so that a first button 82 is used to both lower the impact wrench 40 and rotate the impact wrench in the clockwise (tightening) direction. A second switch 84 lowers the wrench and rotates the wrench in the counter clockwise (loosening) direction.

The switch 80 includes a single air supply connection 86 which in turn is connected to a first manifold 88 and a second manifold 90. The first button 82 is connected to a piston 92 which is spring-mounted in the first manifold 88. Outlet passages 94 and 95 are connected to the manifold 88 so that air is able to enter the passages 94 and 95 when the button 82 is depressed, but blocked from entering when button 82 is not depressed. Passage 94 is connected by pneumatic tubing 98 to the first bore 54a on switch 50. Passage 95 divides into passages 96 and 97. Passage 96 is connected to hose 100 which is connected to the air supply connection 102 on impact wrench 40. Thus, air supply through hose 100 provides the power necessary to drive the impact wrench 40. Passage 97 is connected to inlet 70 of piston and cylinder assembly 64. In this way, depressing button 82 lowers the wrench 40 and rotates the socket 42 in the clockwise direction.

Manifold 90 is similarly connected to passages 102 and 104. Passage 102 is connected to hose 106 which provides air to the second bore 54b in switch 50. Thus, air supplied through hose 106 depresses the second piston 56b which in turn actuates the second switch shaft 58b which causes the impact wrench 40 to rotate in the counter-clockwise direction. Passage 104 is interconnected with passage 95 which, as described hereinbefore, both lowers the impact wrench 40 and provides the air power necessary to rotate the wrench.

The operation of the collet release device 10 may now be easily understood. When the user desires to change cutting tools, rotation of the spindle is stopped, and the spindle is secured. The user then depresses button 84 on control switch 80 which causes the impact wrench to lower, engage the draw bar and rotate the draw bar in the release direction. Upon release of button 84, the impact wrench 40 returns to its raised position and rotation of the socket 42 ceases. The user then replaces the tool with another tool and secures the tool by depressing button 82. Button 82 causes the impact wrench 40 to lower and engage the draw bar 14, as before, but the rotation of the wrench is in the opposite direction.

Although the preferred embodiment has been illustrated in detail, it is apparent that modification and adaptation of that embodiment will occur to those skilled in the art. However, it is to be expressly understood that such modification and adaptation are within the spirit and scope of the present invention as set for in the following claims.

What is claimed is:

1. A device for rotating a draw bar in a machine tool, said draw bar having one end operably connected to a collet and an opposite end adapted to be rotated, said device comprising:

a frame capable of being mounted on the machine tool near the opposite end of the draw bar;

a carriage slidably mounted on the frame so that it is free to move toward and away from the opposite end of the draw bar;

a pneumatic motor mounted on said carriage, said motor having a first selector switch shaft for actuating the motor in a first rotational direction and a second selector switch shaft for actuating the motor in the opposite rotational direction;

means for engaging said rotating the opposite end of the draw bar, said means being operably connected to the motor;

a piston and cylinder assembly mounted to the machine tool and connected to the carriage to raise and lower te engaging means relative to the opposite end of the draw bar; and a single pneumatic control switch comprising (1) a housing having a single pneumatic inlet and four pneumatic outlets, to wit, a first outlet connected to the piston and cylinder assembly, a second outlet operatively connected to the first selector shaft, a third outlet operatively connected to the second selector shaft, and a fourth outlet connected to supply air power to the motor, and (2) two cylinders being interconnected between the inlets and outlets so that depressing one cylinder connects the inlet to the first, second and fourth of the outlets in order to simultaneously actuate the piston and cylinder assembly to lower the engaging means and depress the first selector switch to rotate said engaging means in a first direction, and depressing the second cylinder connects the inlet to the first, third and fourth of the outlets in order to simultaneously actuate the piston and cylinder assembly to lower the engaging means and depress the second selector switch to rotate said engaging means in a second direction, whereby the draw bar may be rotated in either direction.

2. A device as in claim 1, wherein said frame includes a pair of parallel support posts.

3. A device as in claim 1, wherein the carriage is spring-mounted so that it returns to a neutral position where the draw bar is not engaged.

* * * * *